United States Patent Office 3,403,153
Patented Sept. 24, 1968

3,403,153
1-ARYL-4-IMINO-1,2-DIHYDROQUINAZOLINES
Herbert Morton Blatter, Springfield, Richard William James Carney, New Providence, and George de Stevens, Summit, N.J., assignors to Ciba Corporation, New York, N.Y., a corporation of Delaware
No Drawing. Continuation-in-part of application Ser. No. 488,264, Sept. 17, 1965. This application Mar. 20, 1967, Ser. No. 624,211
10 Claims. (Cl. 260—256.4)

ABSTRACT OF THE DISCLOSURE 1-aryl-4-imino-1,4-dihydro-quinazolines of the Formula I

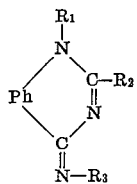

Ph = a 1,2-phenylene
$R_1$ = aromatic radical
$R_2$ = aliphatic or aromatic radical
$R_3$ = H, aliphatic or aromatic radical N-oxides, quaternaries and salts thereof, e.g., the 4-cyclopropyl - imino - 1,2 - diphenyl - 1,4 - dihydro-quinazoline, exhibit antiinflammatory effects.

Cross-references to related applications

This application is a continuation-in-part of application Ser. No. 488,264, filed Sept. 17, 1965, which in turn is a continuation-in-part of application Ser. No. 455,315, filed May 12, 1965, which in turn is a continuation-in-part of application Ser. No. 351,216, filed Mar. 11, 1964 and now abandoned.

Summary of the invention

The present invention concerns and has for its object the provision of new 1-aryl-4-imino-1,4-dihydro-quinazolines, more particularly those of Formula I, in which Ph stands for a 1,2-phenylene radical, $R_1$ for an aromatic radical, $R_2$ for an aliphatic or aromatic radical and $R_3$ for hydrogen, an aliphatic or aromatic radical, N-oxides, quaternaries and salts thereof, corresponding pharmaceutical compositions as well as methods for the preparation of the new compounds. Said compositions are primarily useful as antiinflammatory agents, preferably for oral application in place of corticosteroids, in the treatment of tissue inflammations, such as arthritic and similar conditions.

Description of the preferred embodiments

The 1,2-phenylene radical Ph is unsubstituted or substituted by one or more than one of the same or different substituents attached to any of the positions available for substitution. Such substituents are, for example, lower alkyl, e.g., methyl, ethyl, n- or i-propyl, or -butyl, etherified hydroxy or mercapto, such as lower alkoxy or alkylmercapto, e.g., methoxy, ethoxy, n- or i-propoxy or n-butoxy, methyl- or ethylmercapto, esterified hydroxy, such as halogeno, e.g., fluoro, chloro or bromo, trifluoromethyl, nitro, amino, for example, di-lower alkylamino, e.g., dimethylamino or diethylamino. Preferred 1,2-phenylene radicals Ph are 1,2-phenylene, (lower alkyl)-1,2-phenylene, (lower alkoxy)-1,2-phenylene, (lower alkylmercapto)-1,2-phenylene, (halogeno)-1,2-phenylene, (trifluoromethyl)-1,2-phenylene, (nitro) - 1,2-phenylene and (di-lower alkylamino)-1,2-phenylene.

An aromatic radical $R_1$, $R_2$ and/or $R_3$ particularly stands for mono- or bicyclic carbocyclic aryl, i.e., phenyl, 1- or 2-naphthyl, or monocyclic heterocyclic aryl, such as furyl, thienyl or pyridyl. Said aryl groups are unsubstituted or contain one or more than one of the same or different substituents attached to any position available for substitution, for example those mentioned for Ph. They stand primarily for phenyl, (lower alkyl)-phenyl, (lower alkoxy)-phenyl, (lower alkylmercapto)-phenyl, (halogeno) - phenyl, (trifluoromethyl) - phenyl, (nitro)-phenyl or (di-lower alkylamino)-phenyl.

An aliphatic radical $R_2$ and/or $R_3$ represents especially lower alkyl, e.g., methyl, ethyl, n- or i-propyl, -butyl, -pentyl, -hexyl or -heptyl. It can also stand for lower alkenyl, e.g., allyl or methallyl, 3 to 8 ring-membered cycloalkyl or cycloalkyl-lower alkyl, especially such having from five to seven ring-carbon atoms, e.g., cyclopropyl, cyclopentyl, cyclohexyl, cycloheptyl or cyclooctyl; cyclopropylmethyl, cyclopentylmethyl, 2 - cyclopentylethyl, cyclohexylmethyl, 1-cyclohexylethyl or cycloheptylmethyl, as well as monocyclic carbocyclic aryl-lower alkyl, e.g., benzyl, 1- or 2-phenylethyl. These radicals may contain additional substituents, especially in the aromatic portion, such as those mentioned for Ph, as well as oxo or thiono in the aliphatic portion. They also may be interrupted by hetero atoms, preferably by one oxygen, sulfur and/or nitrogen atom. Such radicals are, for example, lower alkoxy-lower alkyl, such as methoxymethyl, ethoxymethyl, n-propoxymethyl, 1- or 2-methoxy-, ethoxy or i-propoxy-ethyl, 1-, 2- or 3-methoxy-, ethoxy or n-propoxy-propyl or 4-tert. butoxy-butyl, the corresponding phenoxy-lower alkyl and lower alkylmercapto-lower alkyl groups, mono- or di-lower alkylamino-lower alkyl, lower alkyleneimino-lower alkyl, aza-, oxa- or thia-alkyleneimino-lower alkyl or N-lower alkyl- or phenyl-aza-alkyleneimino-lower alkyl groups with 4 to 6 ring-carbon atoms and in which radicals the hetero-atoms are separated by at least two carbon atoms, such as 2-methylamino-, 2-dimethylamino- or 2-diethylamino-ethyl, 3-dimethylamino- or 3-diethylamino-propyl, 2-pyrrolidinoethyl, 3-piperidino-propyl, 2 - piperazino - ethyl, 2-(4-methyl-piperazino)-ethyl, 3-(4-ethyl-piperazino)-propyl, 2-(4-phenyl-piperazino)-ethyl, 2-morpholino-ethyl or 3-thiamorpholino-propyl.

The quaternaries are particularly those containing additional lower alkyl or aralkyl groups, such as those mentioned above, quaternizing at least one tertiary nitrogen atom present.

The compounds of this invention have valuable pharmacological properties. Apart from antimicrobial and diuretic effects, they exhibit primarily antiinflammatory activity, as can be demonstrated in in vitro or animal tests using mammals, such as mice, rats or dogs, as test objects. Besides their above-mentioned utility, the compounds of the invention are also useful as antimicrobial agents, applied either topically or systematically, against bacterial, fungal or protozoal infections, as diuretic agents for the relief of edema and the adjunctive management of hypertension, or as valuable intermediates in the preparation of other useful products, particularly of pharmacologically active compounds. Thus, the corresponding 1-aryl-4-imino-1,2,3,4-tetrahydro-quinazolines, disclosed in copending application Ser. No. 509,613, filed Nov. 24, 1965 and now abandoned, are obtained from the compounds of this invention by hydrogenation.

Particularly useful are compounds of Formula I, in which Ph stands for 1,2-phenylene, (lower alkyl)-1,2-phenylene, (lower alkoxy)-1,2-phenylene or (halogeno)-1,2-phenylene, each of $R_1$ and $R_2$ for phenyl, (lower alkyl)-phenyl, (lower alkoxy)-phenyl or (halogeno)-phenyl, $R_2$ also for lower alkyl and $R_3$ for hydrogen, lower alkyl, 3 to 8 ring-membered cycloalkyl, lower alkenyl, mono- or di-lower alkylamino-lower alkyl, alkyleneimino-lower alkyl in which alkylene has from four to six carbon atoms, or aza-, oxa- or thiaalkyleneimino-lower alkyl in which the ring has from four to six carbon atoms and in which radicals $R_3$ the hetero-atoms are separated from each other by at least two carbon atoms, and acid addition salts thereof.

Especially valuable are those compounds of the Formula I in which Ph stands for 1,2-phenylene, $R_1$ for phenyl, 4-methoxy-phenyl, 4-fluoro-phenyl or 4-chlorophenyl, $R_2$ for phenyl and $R_3$ for lower alkyl or cyclopropyl, and therapeutically acceptable acid addition salts thereof which, when given orally to rats at doses between about 5 and 50 mg./kg./day, preferably between about 10 and 25 mg./kg./day, show outstanding antiinflammatory effects according to the granuloma pouch or carageenin paw test.

The compounds of this invention are prepared according to known methods. For example, the process for their preparation consists in (a) reacting a 1-aryl-4-oxo or thiono-quinazoline or a reactive 4-ether thereof, more particularly a compound of the Formula II

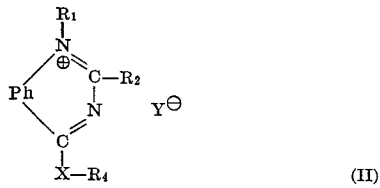

in which X stands for oxygen or sulfur, $R_4$ for lower alkyl and $Y^\ominus$ for the anion of an acid, with a primary or secondary amine, preferably the compound $R_3$—$NH_2$, or (b) dehydrogenating a 1-aryl-4-imino-quinazoline, saturated in one or both rings of the quinazoline moiety, more particularly a compound of the Formulae III or IV

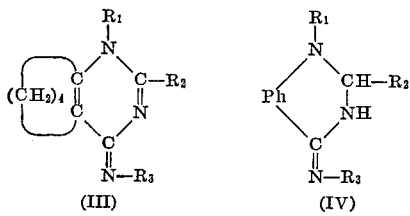

and, if desired, converting any compound obtained into another disclosed compound.

The anion $Y^\ominus$ in Formula II, more particularly is that of a strong inorganic acid, particularly a hydrohalic acid, e.g. hydrochloric, hydrobromic or hydriodic acid, as well as sulfuric acid, or of a strong organic sulfonic acid, e.g. methane sulfonic, 2-hydroxyethane sulfonic or p-toluene sulfonic acid.

The above reactions are carried out in the usual manner by combining the reactants in the absence of advantageously in the presence of a diluent, preferably such that is inert to the reactants and is a solvent thereof, in the presence or absence of a catalyst, condensing or neutralizing agent, while cooling, at room temperature of advantageously at elevated temperatures, under atmospheric or superatmospheric pressure and/or in the atmosphere or an inert gas, e.g. nitrogen.

A neutralizing agent may be used in the reaction with the reactive quaternary 4-ethers, in order to bind the generated acid. Such agent is, for example, an alkali or alkaline earth metal carbonate or lower alkoxide, or more especially, an organic base such as pyridine or collidine, but particularly an aliphatic tertiary amine, such as a tri-lower alkylamine, a tetra-lower alkyl-alkylenediamine, an N-lower alkyl-alkyleneimine, an N-lower alkyl-morpholine or a mixture thereof, such as a mixture of pyridine and triethylamine.

The dehydrogenation according to method (b) is carried out in the usual manner either catalytically, e.g. with the use of palladium, platinum and nickel catalysts, chromium oxide and chromia-alumina catalysts, or by means of dehydrogenation agents, such as sulfur, selenium, selenium oxide, isoamyl disulfide and chloranil.

Any resulting compound containing a free or monosubstituted imino group or tertiary nitrogen atom, can be reacted with a reactive ester of a corresponding aliphatic or aromatic alcohol, e.g. such derived from the above-mentioned strong acids, in order to yield substituted imines and/or quaternary compounds.

In a resulting quaternary compound the anion may be converted into another anion according to known methods. Thus, the anion of an acid may be replaced by the hydroxyl ion, for example, by reacting a resulting quaternary halide with silver oxide, or a quaternary sulfate with barium hydroxide, by treating a quaternary salt with an anion exchange preparation or by electrodialysis. From any resulting quaternary hydroxide, there may be obtained quaternary salts by reacting the quaternary base with an acid, for example, one of those mentioned hereinafter. A resulting quaternary salt may also be converted directly into another quaternary salt without the formation of an intermediate quaternary hydroxide. For example, a quaternary iodide may be reacted with freshly prepared silver chloride or with hydrochloric acid in anhydrous methanol to yield the quaternary ammonium chloride; a quaternary salt may also be converted into another quaternary salt by treatment with an anion exchange preparation. Resulting tertiary amines may be reacted with an oxidizing agent, such as ozone, hydrogen peroxide or a peracid, e.g. persulfuric, peracetic, perbenzoic or monoperphthalic acid, in order to yield the N-oxides.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with inorganic or organic acids, especially those that are suitable for the formation of therapeutically useful salts. Such acids are, for example, hydrohalic acids, e.g. hydrochloric or hydrobromic acid, sulfuric, phosphoric, nitric or perchloric acid, aliphatic, alicyclic, araliphatic,, aromatic or heterocyclic carboxylic or sulfonic acids, for example, formic, acetic, propionic, succinic, glycollic, lactic, malic, tartaric, citric asorbic, maleic, hydroxymaleic, pyroracemic, phenylacetic, benzoic, aminobenzoic, anthranilic, hydroxybenzoic, salicyclic, aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic and sulfanilic acid; methionine, tryptophan, lysine and arginine.

These or other salts, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The present invention also comprises any modification of the above process, wherein a compound obtainable as an intermediate at any stage thereof is used as starting material and any remaining steps are carried out, or the process is discontinued at any stage thereof, or in which the starting materials are formed under the reaction conditions or are used in the form of their salts. Mainly those starting materials should be used in the present process that lead to the formation of those compounds indicated above as being especially valuable.

The starting material used is new, but can be obtained according to methods known per se, for example, by
(a) reacting a compound of the formula

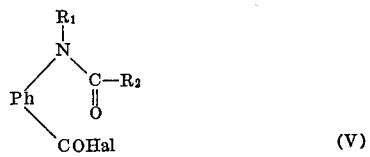

(V)

in which Hal stands for a halogen atom, with ammonia or an ammonia-furnishing reagent or
(b) scbjecting a compound having one of the formulae

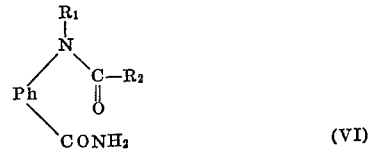

(VI)

and

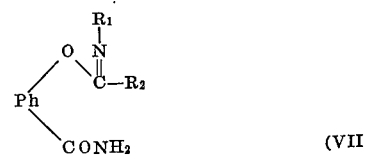

(VII)

to an elevated temperature.

The acid halide of the Formula V can be obtained by treating the acid $R_1$—NH—Ph—COOH with a reactive functional derivative of the acid $R_2$—COOH, such as a halide, e.g. the chloride or the anhydride thereof, and treating the acid obtained with a thionyl halide, e.g. thionyl chloride, a phosphoric acid halide, e.g. phosphorus tribromide, phosphorus pentachloride or phosphorus oxychloride.

The acid amide of the Formula VI, which is formed in reaction (a) as an intermediate, can be obtained by reaction of the acid amide $R_1$—NH—Ph—$CONH_2$ with a reactive functional derivative of the acid $R_2$—COOH.

The acid amide of the Formula VII may be obtained by reaction of the acid amide HO—Ph—$CONH_2$ with the imidoyl halide

wherein $R_2$ preferably is a carbocyclic aryl group, in the presence of an alkali metal lower alkoxide. Resulting 1-aryl-4-oxo-quinazolines can be converted into the 4-thiono compounds by treatment with phosphorus pentasulfide in the presence of a high-boiling solvent, e.g. xylene. Their 4-ethers are obtained by reacting the 1-aryl-4-oxa or thiono-quinazoline with a reactive ester of an alcohol, preferably a lower alkyl halide.

The starting material of Formulae III and IV is described in copending applications Ser. Nos. 555,691, filed June 7, 1966 and 509,613, filed Nov. 24, 1965, respectively.

The compounds of this invention are useful in the form of compositions for enteral, parenteral or topical administration, which contain a pharmacologically effective amount of the compounds of this invention in admixture with a pharmaceutically acceptable, organic or inorganic, solid or liquid carrier, which usually represents the major portion of the pharmaceutical composition. For making up the latter, there are employed carrier materials suitable for the preparation of pharmaceutical compositions, such as water, gelatine, sugars, e.g. lactose, glucose or sucrose, starches, e.g. corn starch, wheat starch or rice starch, stearic acid or salts thereof, e.g. calcium or magnesium stearate, talc, vegetable oils, alcohols, e.g. ethanol, benzyl alcohol or cetyl alcohol, petrolatum, gums, accacia, propylene glycol, polyalkylene glycols or any other known carrier for pharmaceutical compositions. The pharmaceutical preparations may be in solid form, e.g. capsules, tablets or dragees, in liquid form, e.g. solutions or suspensions, or in the form of emulsions, e.g. salves or creams. If desired, they may contain auxiliary substances, such as preserving stabilizing, wetting, emulsifying, or coloring agents, salts for varying the osmotic pressure or buffers. The above preparations are prepared according to standard methods used for the manufacture of pharmaceutically acceptable compositions, which contain about 0.1 to 75%, more particularly 1 to 50%, of the active ingredient. They may also contain, in combination, other pharmacologically useful substances.

The following examples are intended to illustrate the invention and are not to be construed as being limitations thereon. Temperatures are given in degrees centigrade and all parts wherever given are parts by weight.

Example 1

To the solution of 2.0 g. 1-(4-fluoro-phenyl)-2-phenyl-4-methylmercapto-quinazolinium iodide in 20 ml. dimethylformamide, 0.75 g. n-propylamine are added dropwise while stirring. After standing for 15 minutes at room temperature, water is added, the precipitate formed filtered off and recrystallized from acetone to yield the desired 1-(4-fluoro-phenyl)-2-phenyl-4-n-propylamino-1,4-dihydro-quinazoline of the formula

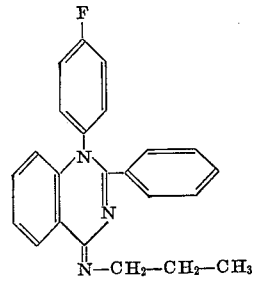

melting at 234–235°.

The starting material is prepared as follows:

To the mixture of 33.3 g. 4-fluoro-aniline and 100 ml. pyridine, 42.1 g. benzoylchloride are added slowly while cooling and stirring. Hereupon the reaction mixture is poured into 600 ml. water, the precipitate formed filtered off, washed with water and recrystallized from ethanol to yield the N-(4-fluoro-phenyl)-benzamide melting, after recrystallization from ethanol, at 183 to 187°.

The mixture of 46.0 g. thereof and 100 ml. thionylchloride is refluxed for 3 hours and then evaporated. The residue is distilled and the fraction boiling at 182°/20 mm. Hg collected. It represents the N-(4-fluoro-phenyl)-benzimidchloride.

The solution of 4.66 g. thereof in 25 ml. diethyl ether is added rapidly to the mixture prepared from the solution of 1.35 g. sodium methoxide in 50 ml. anhydrous ethanol to which 4.56 g. methyl salicylate have been added rapidly while stirring. The mixture is allowed to stand at room temperature for 30 minutes and is evaporated in vacuo. The residue is triturated with water, filtered off and recrystallized from ethanol to yield the 2-carbomethoxy-phenyl N-(fluoro-phenyl)-benzimidoate melting at 126–130°.

85.0 g. thereof are heated to 275° for 10 minutes. After cooling the residue is triturated with diethyl ether, filtered off and recrystallized from methanol to yield the methyl N-benzoyl-N-(4-fluoro-phenyl)-anthranilate melting at 110–116°.

To the solution of 34.9 g. thereof in 200 ml. ethanol and 110 ml. water the mixture of 5.4 g. sodium methoxide, 100 ml. ethanol and 20 ml. water is added. The mixture is refluxed for 1½ hours, concentrated and the aqueous solution acidified with concentrated hydrochloric acid. It is extracted with methylene chloride, the extract evaporated, the residue taken up in aqueous sodium bicarbonate, the solution acidified with hydrochloric acid, the precipitate formed filtered off, dissolved in methylene chloride, the solution dried and diluted with hexane. The precipitate formed is filtered off and recrystallized from diethyl ether to yield the N-benzoyl-N-(4-fluorophenyl)-anthranilic acid melting at 176–178°.

The mixture of 20.0 g. thereof and 100 ml. phosphorus oxychloride is refluxed for 19 hours and then evaporated. The residue is taken up in about 200 ml. methylene chloride and the solution of the resulting acid chloride treated for 1 hour with ammonia until it becomes basic. It is washed with water, dried, concentrated, the concentrate diluted with hexane, the precipitate formed filtered off, and recrystallized from acetone-hexane to yield the 1-(4-fluoro - phenyl)-2-phenyl - 3,4 - dihydro-4-quinazolone melting at 289–290°.

The mixture of 10.5 g. thereof, 8.9 phosphorus pentasulfide and 150 ml. xylene is refluxed for 2 hours while stirring. After cooling 60 ml. of 10% aqueous sodium hydroxide are added, the precipitate formed filtered off, washed with hot ethanol and recrystallized from acetone, while using charcoal for decolorization, to yield the 1-(4-fluoro-phenyl) - 2 - phenyl-1,4-dihydro-quinazolin-4-thione melting at 293–296°.

The mixture of 8.75 g. thereof and 15 ml. methyliodide is refluxed for 1½ hours. The solid is filtered off and recrystallized from acetone to yield the 1-(4-fluoro-phenyl)-2-phenyl-4-methylmercapto-quinazolinium iodide melting at 270–290° with decomposition.

Example 2

Through the deep red solution of 0.7 g. of 1-(4-fluorophenyl)-4-methylmercapto-2-phenyl-quinazolinium iodide in 15 ml. of dimethylformamide, methylamine is bubbled until the color changes to pale yellow. After standing at room temperature for 15 minutes water is added until no more precipitate is formed. The latter is filtered off and recrystallized once from diethyl ether to yield the 1-(4-fluoro-phenyl) - 4 - methylimino-2-phenyl-1,4-dihydroquinazoline of the formula

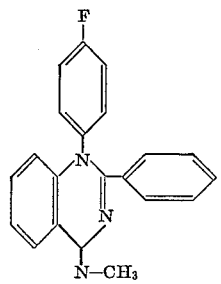

melting at 228–230°.

By using ammonia, ethylamine or dimethylamine instead of methylamine the 1-(4-fluoro-phenyl)-4-imino-2-phenyl-1,4-dihydro-quinazoline, 1-(4-fluoro-phenyl) - 4-ethylimino-2-phenyl-1,4-dihydro-quinazoline and 1-(4-fluoro - phenyl)-4-dimethylamino-2-phenyl-quinazolinium iodide of the formula

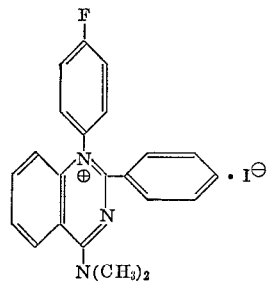

are obtained, the latter is melting at 275–276° (acetone).

Example 3

The mixture of 0.25 g. of 1-(4-fluoro-phenyl)-4-methylmercapto-2-phenyl-quinazolinium iodide and 1.0 ml. of 2-dimethylamino-ethylamine is allowed to stand at room temperature until the orange color disappears and the gas evolution ceases. After about 10 minutes water is added, the precipitate formed is filtered off and recrystallized once more from diethyl ether-pentane with the use of charcoal. There is obtained the 1-(4-fluoro-phenyl)-4-(2-dimethylamino-ethylimino) - 2 - phenyl-1,4-dihydro-quinazoline of the formula

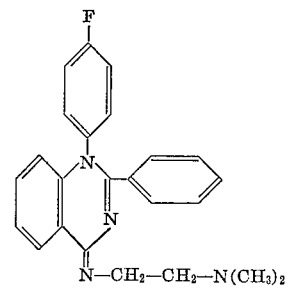

melting at 181–183°.

In the analogous manner the 1-(4-fluoro-phenyl)-4-(2-methylamino-ethylimino) - 2 - phenyl-1,4-dihydro-quinazoline and the 1-(4-fluoro-phenyl)-4-(2-amino-ethylimino)-2-phenyl-1,4-dihydroquinazoline are prepared.

Example 4

0.5 g. of 1-(4-fluoro-phenyl)-4-methylmercapto-2-phenylquinazolinium iodide and 1.5 g. of N-(2-aminoethyl)-N'-phenylpiperazine are mixed together and the mixture is molten on a steam bath, during which methylmercaptan is given off and the orange color disappears. After about 15 minutes water is added and the white solid filtered off. It is recrystallized once from acetone and yields the 1-(4-fluoro-phenyl)-4-[2-(4-phenyl-piperazino)-ethylimino]-2-phenyl - 1,4 - dihydro-quinazoline of the formula

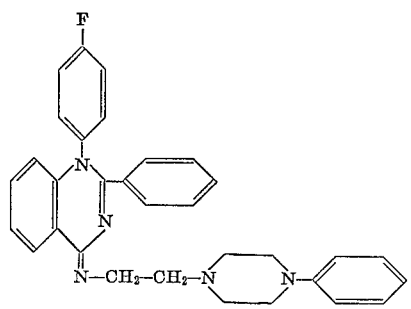

melting at 244–246° with decomposition.

Using glycine or its methylester, instead of the piperazine compound, the 1-(4-fluoro-phenyl)-4-carboxy-methylimino)-2-phenyl-1,4-dihydro-quinazoline of the formula

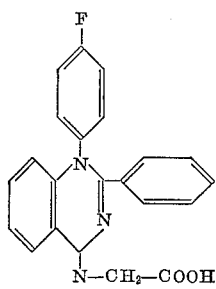

or its methylester can be prepared.

Example 5

Ammonia is bubbled through the dark red solution of 2.2 g. of 1-(4-fluoro-phenyl)-2-phenyl-4-methylmercaptoquinazolinium iodide in 40 ml. of dimethylformamide, causing a rapid color change to pale yellow. Bubbling is continued for another 5 minutes, then the mixture is allowed to stand for 15 minutes. It is filtered through sintered glass to remove a trace of insoluble matter, then water is added to the filtrate causing a pale yellow-white solid to precipitate. This is filtered off, air-dried and recrystallized 3 times from acetone-diethyl ether to yield the 1-(4-fluoro-phenyl) - 4 - imino - 2 - phenyl-1,4-dihydroquinazoline of the formula

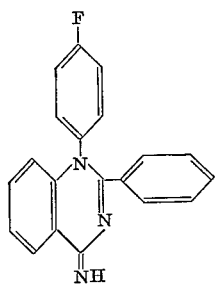

Example 6

Monoethylamine is bubbled through the dark red solution of 1.5 g. of 1-(4-fluoro-phenyl)-2-phenyl-4-methylmercaptoquinazolinium iodide in 30 ml. of dimethyl formamide, causing a rapid color change to pale yellow. Bubbling is continued for 5 minutes, then the solution is allowed to stand for 15 minutes. Water is added until no more precipitate appears. The white solid precipitate is filtered off and recrystallized from acetone-diethyl ether to yield the 1-(4-fluoro-phenyl)-4-ethylimino-2-phenyl-1,4-dihydro-quinazoline of the formula

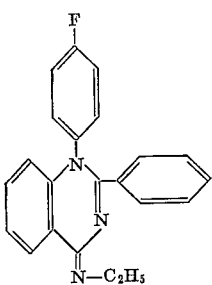

melting at 234–236°.

Example 7

0.5 g. 1-(4-fluoro-phenyl) - 2 - phenyl-4-n-propylimino-1,4,5,6,7,8-hexahydro-quinazoline are dissolved in 100 ml. cyclohexane, to the solution 0.1 g. 10% palladium-charcoal are added and the mixture is refluxed for 24 hours. Hereupon the catalyst is filtered off, the filtrate evaporated under reduced pressure and the residue recrystallized from acetone using charcoal for decolorization to yield the 1-(4-fluoro-phenyl)-4-n-propylimino-2-phenyl-1,4-dihydro-quinazoline, which is identical with that obtained according to Example 1.

Example 8

0.5 g. of 1-(4-fluoro-phenyl)-2-phenyl-4-n-propylimino-1,4,5,6,7,8-hexahydro-quinazoline and 0.2 g. sulfur are dissolved in the minimum amount of dimethylformamide necessary for dissolution, the whole is refluxed for 30 minutes, then the mixture is evaporated under reduced pressure, the residue is dissolved in acetone, the solution filtered, the filtrate concentrated and kept in the cool to yield the crystalline 1-(4-fluoro-phenyl)-4-n-propylimino-2-phenyl-1,4-dihydro-quinazoline which is identical with that obtained according to Example 1.

Example 9

In the manner described in Examples 1–6, the following compounds are prepared by using the equivalent amounts of the corresponding starting materials:

| Compound | M.P. (deg.) | Recrystallized from— |
|---|---|---|
| 4-i-propylimino-1-(4-fluoro-phenyl)-2-phenyl-1,4-dihydro-quinazoline. | 217–219 | Diethyl ether. |
| 4-n-butylimino-1-(4-fluoro-phenyl)-2-phenyl-1,4-dihydro-quinazoline. | 195–197 | Acetone. |
| 4-(2-butylimino)-1-(4-fluoro-phenyl)-2-phenyl-1,4-dihydro-quinazoline. | 190–198 | Methanol. |
| 4-(2-methyl-propylimino)-1-(4-fluoro-phenyl)-2-phenyl-1,4-dihydro-quinazoline. | 204–213 | Do. |
| 4-n-pentylimino-1-(4-fluoro-phenyl)-2-phenyl-1,4-dihydro-quinazoline. | 182–184 | Acetone. |
| 4-(4-fluorophenylimino)-1-(4-fluoro-phenyl)-2-phenyl-1,4-dihydro-quinazoline. | 210–213 | Diethyl ether. |
| 4-(carbethoxymethylimino)-1-(4-fluoro-phenyl)-2-phenyl-1,4-dihydro-quinazoline. | 213–215 | Acetone. |
| 4-allylimino-1-(4-fluoro-phenyl)-2-phenyl-1,4-dihydro-quinazoline. | 229–230 | Methanol. |
| 4-(4-fluorobenzylimino)-1-(4-fluoro-phenyl)-2-phenyl-1,4-dihydro-quinazoline. | 195–196 | Acetone-hexane. |
| 4-cyclopropylimino-1-(4-fluoro-phenyl)-2-phenyl-1,4-dihydro-quinazoline. | 243–244 | Methanol. |
| 4-cyclopropylmethylimino-1-(4-fluoro-phenyl)-2-phenyl-1,4-dihydro-quinazoline. | 223 225 | Do. |
| 4-(2-butylimino)-1,2-diphenyl-1,4-dihydro-quinazoline. | 199 | Do. |
| 4-allylimino-1,2-diphenyl-1,4-dihydro-quinazoline. | 224–226 | Do. |
| 4-cyclopropylimino-1,2-diphenyl-1,4-dihydro-quinazoline. | 222–223 | Do. |
| 4-(4-fluorobenzylimino)-1,2-diphenyl-1,4-dihydro-quinazoline. | 187–188 | Do. |
| 4-(2-butylimino)-1-(4-chloro-phenyl)-2-phenyl-1,4-dihydro-quinazoline. | 199–204 | Do. |
| 4-(2-methyl-propyl)-1-(4-chloro-phenyl)-2-phenyl-1,4-dihydro-quinazoline. | 217–218 | Do. |

Example 10

To the solution of 1.0 g. 4-methylmercapto-1-(4-methoxyphenyl)-2-phenyl-quinazolinium iodide in 20 ml. dimethylformamide 0.5 g. cyclopropylamine are added dropwise while stirring and the mixture is allowed to stand at room temperature overnight. Hereupon water is added, the precipitate formed filtered off and recrystallized from methanol to yield the 4-cyclopropylimino-1-(4-methoxyphenyl)-2-phenyl-1,4-dihydro-quinazoline of the formula

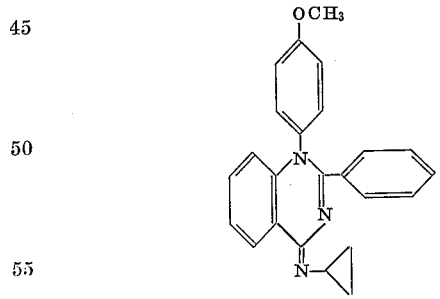

The starting material used in the above procedure is prepared as described in Example 1, i.e. by reacting methyl salicylate with N-(4-methoxy-phenyl)-benzimidoyl chloride in the presence of sodium methoxide, heating the resulting 2-carbomethoxy-phenyl N-(4-methoxy-phenyl)-benzimidoate (M.P. 115–117°, after recrystallization from ethanol) at 275°, hydrolizing the methyl N - benzoyl - N-(4-methoxy-phenyl)-anthranilate (M.P. 151–153°, after recrystallization from a mixture of acetone and hexane) with sodium hydroxide in aqueous ethanol, converting the N-benzoyl-N-(4-methoxy-phenyl)-anthranilic acid (M.P. 184–187°, after recrystallization from a mixture of acetone and hexane) into its amide, by treating the acid chloride with ammonia, heating the N-benzoyl-N-(4-methoxy-phenyl)-anthranilic acid amide, contaminated with 1-(4-methoxy-phenyl)-2-phenyl-1,4-dihydro-quinazoline-4-one, to 300°, reacting the 1-(4-methoxy-phenyl)-2-phenyl-1,4-dihydroquinazolin - 4 - one (M.P. 240–243°, after recrystallization from ethanol)

with phosphorus pentasulfide and treating the resulting 1-(4-methoxy-phenyl) - 2 - phenyl-1,4-dihydro-quinazolin-4-thione with methyl iodide, to yield the 4-methylmercapto-1-(4 - methoxy-phenyl) - 2 - phenyl-quinazolinium iodide.

Example 11

By selecting the following starting materials in the proportions shown in the previous examples, the final products listed are prepared:

| Starting Material | | Final Product |
|---|---|---|
| 4-methylmercapto-1-phenyl-2-methyl-quinazolinium iodide | 2-ethylamino-ethylamine | 4-(2-ethylamino-ethylimino)-1-phenyl-2-methyl-1,4-dihydro-quinazoline. |
| 4-methylmercapto-1-(4-methyl-phenyl)-2-ethyl-quinazolinium iodide | 2-pyrrolidino-ethylamine | 4-(2-pyrrolidino-ethylimino)-1-(4-methyl-phenyl)-2-ethyl-1,4-dihydro-quinazoline. |
| 4-methylmercapto-1-(3-trifluoromethyl-phenyl)-2-benzyl-quinazolinium iodide | 2-piperazino-ethylamine | 4-(2-piperazino-ethylimino)-1-(3-trifluoro-methyl-phenyl)-2-benzyl-1,4-dihydro-quinazoline. |
| 4-ethylmercapto-1,2-diphenyl-6-methoxy-quinazolinium iodide | 2-morpholino-ethylamine | 4-(2-morpholino-ethylimino)-1,2-diphenyl-6-methoxy-1,4-dihydro-quinazoline. |
| 4-methylmercapto-1,2-diphenyl-6-methyl-quinazolinium iodide | 2-thiamorpholino-ethylamine | 4-(2-thiamorpholino-ethylimino)-1,2-diphenyl-6-methyl-1,4-dihydro-quinazoline. |
| 4-methylmercapto-6-chloro-1,2-diphenyl-quinazolinium iodide | Cyclopentylamine | 4-cyclopentylimino-6-chloro-1,2-diphenyl-1,4-dihydro-quinazoline. |
| 4-methylmercapto-1-(3,4-dichloro-phenyl)-2-(4-methyl-phenyl-quinazolinium iodide | 2-ethoxy-ethylamine | 4-(2-ethoxy-ethylimino)-1-(3,4-dichloro-phenyl)-2-(4-methyl-phenyl)-1,4-dihydro-quinazoline. |
| 4-benzylmercapto-1-(4-bromo-phenyl)-2-isopropyl-quinazolinium bromide | 3-methylmercapto-propylamine | 4-(3-methylmercapto-propylimino)-1-(4-bromophenyl)-2-isopropyl-1,4-dihydro-quinazoline. |
| 4-(methylmercapto)-1-phenyl-2-(3-nitro-phenyl)-quinazolinium iodide | 2-phenoxy-ethylamine | 4-(2-phenoxy-ethylimino)-1-phenyl-2-(3-nitro-phenyl)-1,4-dihydro-quinazoline. |
| 4-methylmercapto-1-phenyl-2-(4-bromo-phenyl)-quinazolinium iodide | Cyclopropylmethylamine | 4-cyclopropylmethylimino-1-phenyl-2-(4-bromo-phenyl)-1,4-dihydro-quinazoline. |
| 4-methylmercapto-1-phenyl-2-(4-methyl-phenyl)-quinazolinium iodide | Benzylamine | 4-benzylimino-1-phenyl-2-(4-methyl-phenyl)-1,4-dihydro-quinazoline. |
| 4-methylmercapto-1-(2-naphthyl)-2-(4-methoxy-phenyl)-quinazolinium iodide | 2-cyclopentyl-ethylamine | 4-(2-cyclopentyl-ethylimino)-1-(2-naphthyl)-2-(4-methoxy-phenyl)-1,4-dihydro-quinazoline. |
| 4-ethylmercapto-1-phenyl-2-(4-methylmercapto-phenyl)-quinazolinium iodide | n-Hexylamine | 4-n-hexylimino-1-phenyl-2-(4-methylmercapto-phenyl)-1,4-dihydro-quinazoline. |
| 4-methylmercapto-1-(4-chloro-phenyl)-2-phenyl-quinazolinium iodide | Ammonia | 4-imino-1-(4-chloro-phenyl)-2-phenyl-1,4-dihydro-quinazoline. |

Example 12

Preparation of 10,000 tablets, each containing 10 mg. of the drug substance—

Formula:

| | Grams |
|---|---|
| 4-cyclopropylimino-1,2-diphenyl-1,4-dihydro-quinazoline | 100.00 |
| Lactose | 1,157.00 |
| Talcum powder | 75.00 |
| Magnesium stearate | 18.00 |
| Corn starch, anhydrous | 75.00 |
| Polyethylene glycol 6000 m.w. | 75.00 |
| Purified water | q.s. |

Procedure

The drug substance, lactose, talcum, magnesium stearate and half of the starch are passed through a screen with 1 mm. openings and mixed thoroughly. The remaining 37.5 g. of the starch are suspended in 37.5 ml. water, 112.5 ml. boiling water are added while stirring, followed by the mixture of the polyethylene glycol and 37.5 ml. water. With the resulting paste the mixed powder is granulated, using more water if required. The granulate is dried overnight at 35–40°, broken through a screen with 4 mm. openings and compressed into tablets using 6.4 mm. concave punches, uppers bisected.

In the above formula the drug substance can be replaced by the same amount of 4-n-propylimino-, 4-i-propylimino- or 4 - n-butylimino - 1 - (4-fluoro-phenyl)-2-phenyl-1,4-dihydroquinazoline.

We claim:

1. A member selected from the group consisting of the compound having the formula

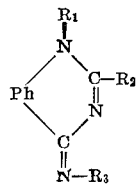

in which Ph is a member selected from the group consisting of 1,2-phenylene, (lower alkyl)-1,2-phenylene, (lower alkoxy)-1,2-phenylene, (lower alkylmercapto)-1,2-phenylene, (halogeno)-1,2-phenylene, (trifluoromethyl)-1,2-phenylene, (nitro)-1,2-phenylene, and (di-lower alkylamino)-1,2-phenylene, $R_1$ is a member selected from the group consisting of phenyl, (lower alkyl)-phenyl, (lower alkoxy)-phenyl, (lower alkylmercapto)-phenyl (halogeno) - phenyl, (trifluoromethyl) - phenyl, (nitro)- phenyl and (di-lower alkylamino)-phenyl, $R_2$ is a member selected from the group consisting of lower alkyl, lower alkenyl, 3 to 8 ring-membered cycloalkyl and cycloalkyl-lower alkyl, phenyl-lower alkyl, lower alkoxy-lower alkyl, lower alkylmercapto-lower alkyl, phenoxy-lower alkyl, lower alkylamino-lower alkyl, di-lower alkylamino-lower alkyl, lower alkyleneimino-lower alkyl, 6 to 8 ring-membered azaalkyleneimino-lower alkyl, oxaalkyleneimino-lower alkyl and thiaalkyleneimino-lower alkyl in which the heteroatoms are separated by at least two carbon atoms, carboxy-lower alkyl and carbo-lower alkoxy-lower alkyl and $R_1$, and $R_3$ is a member selected from the group consisting of hydrogen, and $R_2$, the N-oxides, therapeutically acceptable lower alkyl and phenyl-lower alkyl quaternaries, and therapeutically acceptable acid addition salts thereof.

2. A compound as claimed in claim 1 and having the formula

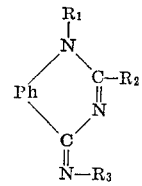

in which Ph is a member selected from the group consisting of 1,2-phenylene, (lower alkyl)-1,2-phenylene, (lower alkoxy)-1,2-phenylene and (halogeno)-1,2-phenylene, $R_1$ is a member selected from the group consisting of phenyl, (lower alkyl)-phenyl, (lower alkoxy)-phenyl and (halogeno)-phenyl, $R_2$ is a member selected from the group consisting of lower alkyl, phenyl, (lower alkyl)-phenyl, (lower alkoxy)-phenyl and (halogeno)-phenyl, $R_3$ is a member selected from the group consisting of hydrogen, lower alkyl, 3 to 8 ring-membered cycloalkyl, lower alkenyl, lower alkylamino-lower alkyl, di-lower alkylamino-lower alkyl, 5 to 7 ring-membered alkyleneimino-lower alkyl, 6 to 8 ring-membered azaalkyleneimino-lower alkyl, oxaalkyleneimino-lower alkyl and thiaalkyleneimino-lower alkyl in which the heteroatoms are separated by at least two carbon atoms, and therapeutically acceptable acid addition salts thereof.

3. A compound as claimed in claim 1 and having the formula

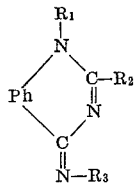

in which Ph is 1,2-phenylene, $R_1$ is a member selected from the group consisting of phenyl, 4-methoxy-phenyl, 4-fluoro-phenyl and 4-chloro-phenyl, $R_2$ is phenyl and $R_3$ is a member selected from the group consisting of lower alkyl and cyclopropyl, and therapeutically acceptable acid addition salts thereof.

4. A compound as claimed in claim 1 and being the 4-(R-imino) - 1,2-diphenyl - 1,4-dihydro-quinazoline, in which R is a member selected from the group consisting of 2-butyl and allyl.

5. A compound as claimed in claim 1 and being the 4-cyclopropylimino - 1,2-diphenyl - 1,4-dihydro-quinazoline.

6. A compound as claimed in claim 1 and being the 4-(R-imino)-1-(4-fluoro-phenyl) - 2-phenyl-1,4 - dihydro-quinazoline, in which R is a member selected from the group consisting of methyl, ethyl, 2-methyl-propyl, 2-butyl, n-pentyl, allyl, cyclopropyl and cyclopropylmethyl.

7. A compound as claimed in claim 1 and being the 4 - (R - imino) - 1 - (4 - chloro - phenyl) - 2 - phenyl - 1,4-dihydro-quinazoline, in which R is a member selected from the group consisting of 2-methyl-propyl and 2-butyl.

8. A compound as claimed in claim 1 and being the 1-(4-fluoro-phenyl)-4-n-propylimino - 2-phenyl - 1,4-dihydroquinazoline.

9. A compound as claimed in claim 1 and being the 1-(4-fluoro-phenyl) - 4-i-propylimino - 2-phenyl-1,4-dihydroquinazoline.

10. A compound as claimed in claim 1 and being the 1-(4-fluoro-phenyl) - 4-n-butylimino - 2-phenyl-1,4-dihydroquinazoline.

References Cited

UNITED STATES PATENTS 3,340,260  9/1967  Blatter _____ 260—256.4

NICHOLAS S. RIZZO, *Primary Examiner.*

R. J. GALLAGHER, *Assistant Examiner.*